US010778072B2

(12) United States Patent
Okuda et al.

(10) Patent No.: US 10,778,072 B2
(45) Date of Patent: Sep. 15, 2020

(54) ELECTRICAL CONDUCTOR BENDING METHOD AND APPARATUS (71) Applicant: HONDA MOTOR CO., LTD., Tokyo (JP)

(72) Inventors: Shuhei Okuda, Tochigi (JP); Takashi Matsuo, Tochigi (JP); Toru Eguchi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 16/267,679

(22) Filed: Feb. 5, 2019

(65) Prior Publication Data
US 2019/0245417 A1    Aug. 8, 2019

(30) Foreign Application Priority Data

Feb. 7, 2018    (JP) .................................. 2018-020041

(51) Int. Cl.
*H02K 1/14*    (2006.01)
*H02K 15/06*    (2006.01)
(Continued)

(52) U.S. Cl.
CPC ............. *H02K 15/064* (2013.01); *H02K 3/12* (2013.01); *H02K 15/0031* (2013.01); *H02K 15/0087* (2013.01); *H02K 15/0428* (2013.01)

(58) Field of Classification Search
CPC .... H02K 15/064; H02K 3/12; H02K 15/0031; H02K 15/0087; H02K 15/0428;
(Continued)

(56) References Cited

U.S. PATENT DOCUMENTS 6,249,956 B1 *  6/2001  Maeda ............... H02K 15/0428
                                                    140/102.5
7,086,136 B2 *  8/2006  Gorohata ................ H02K 3/12
                                                    219/125.11
(Continued)

FOREIGN PATENT DOCUMENTS

CN       102263451       11/2011
JP       2003-219588     7/2003
(Continued)

OTHER PUBLICATIONS

Japanese Office Action dated Sep. 24, 2019, 3 pages.
Chinese Office Action dated Jul. 29, 2020, 7 pages.

*Primary Examiner* — Thanh Lam
(74) *Attorney, Agent, or Firm* — Rankin, Hill & Clark LLP (57) ABSTRACT A control device moves a split claw (11) holding a projecting portion (4d) of an eighth-layer coil segment (4) in a counterclockwise direction D1. At this time, the control device moves first to third extended blades (13a) to (13c) in an outward direction D3 so that the projecting portion (4d) of the eighth-layer coil segment (4) is bent in the outward direction D3. Then, the control device moves the first to third extended blades (13a) to (13c) in an inward direction D4. Through the above steps, the projecting portion (4d) of the eighth-layer coil segment (4) is bent in the counterclockwise direction D1 while being bent in the outward direction D3. As a result, a return force tending to return in the inward direction D4 is generated by an elastic deformation force.

2 Claims, 10 Drawing Sheets (51) Int. Cl.
*H02K 3/12* (2006.01)
*H02K 15/00* (2006.01)
*H02K 15/04* (2006.01)

(58) Field of Classification Search
CPC ......... Y10T 29/49009; Y10T 29/49012; Y10T 29/49071; Y10T 29/49073
USPC ........ 310/40 R, 71, 179–184, 201, 202, 208; 29/596, 598, 605, 606
See application file for complete search history.

(56) References Cited

U.S. PATENT DOCUMENTS

| | | | |
|---|---|---|---|
| 8,296,926 B2 * | 10/2012 | Wang | H02K 15/0081 29/596 |
| 8,434,212 B2 * | 5/2013 | Okushita | H02K 15/0478 29/596 |
| 9,531,227 B2 * | 12/2016 | Azusawa | H02K 3/28 |
| 9,847,684 B2 * | 12/2017 | Suzuki | H02K 3/14 |

FOREIGN PATENT DOCUMENTS

| | | |
|---|---|---|
| JP | 3786059 | 3/2006 |
| JP | 2015-047039 | 3/2015 |
| JP | 2016-131424 | 7/2016 |

* cited by examiner

ELECTRICAL CONDUCTOR BENDING METHOD AND APPARATUS

BACKGROUND OF THE INVENTION

Field of the Invention

The present invention relates to an electrical conductor bending method and apparatus.

Description of the Related Art

The rotary electric machine such as an electric motor and a generator comprises a stator formed in a cylindrical shape and a rotor rotatably disposed inside the stator.

A coil is formed in such a way that a leg portion of a U-shaped coil segment is inserted into a slot provided in a stator core of the stator, and then a projecting portion thereof is bent in a circumferential direction, and then the distal end portions of the mutually adjacent projecting portions are welded (for example, see Japanese Patent No. 3786059).

In the coil, since the distal end portions of the projecting portions of a pair of coil segments are welded, the projecting portions are preferably close to each other so as to facilitate welding. However, the coil disclosed in Patent Literature 1 has a difficulty in welding because the projecting portions are bent only in the circumferential direction, which increases the distance between the projecting portions of the pair of coil segments.

SUMMARY OF THE INVENTION

An object of the present invention, which has been made in view of the above circumstances, is to provide an electrical conductor bending method and apparatus for bending an electrical conductor so as to facilitate welding.

An electrical conductor bending method of the present invention is an electrical conductor bending method, in which a leg portion of each of a pair of electrical conductors formed in a U-shape and arranged in a radial direction of an annular shaped stator core is inserted into each of a plurality of slots provided on a circumference of the stator core, a projecting portion of the leg portion projecting from the slot is held by a holding member, the holding member holding the projecting portion is moved in a circumferential direction of the stator core, and thereby the projecting portion is bent in the circumferential direction, wherein the method comprises a bending step of, while applying a stress in an outward direction of the radial direction by pressing a pressure member against one of projecting portions disposed outside the radial direction of the pair of electrical conductors, moving the holding member holding the one of the projecting portions in the circumferential direction to thereby bend the one of the projecting portions in the circumferential direction.

According to the present invention, while applying a stress in an outward direction of the radial direction to the projecting portion of one leg portion disposed outside the radial direction, the projecting portion of the one leg portion is bent in the circumferential direction, and thus a return force (spring back) tending to return in an inward direction is generated by an elastic deformation force in the projecting portion of the one leg portion after bending process. Therefore, the return force facilitates clamping for welding since the projecting portion of the one leg portion (outside) is close to the projecting portion of the other leg portion (inside) in comparison with the method without a return force.

Further, it is preferable that in the bending step, the pressure member applies the stress in the outward direction of the radial direction to a root portion of the one of the projecting portions.

According to this configuration, when a stress in the outward direction of the radial direction is applied to the projecting portion of the leg portion by moving the pressure member in the radial direction, the projecting portion can be greatly bent in the outward direction of the radial direction by a small moving distance.

Further, it is preferable that a plurality of electrical conductor units each having at least one of the pair of electrical conductors are inserted into the same slot so as to require a clearance at a boundary therebetween in the radial direction, and in the bending step, the projecting portion of the electrical conductor disposed at the outermost position in the radial direction of the electrical conductor units other than the electrical conductor units located at the outermost position in the radial direction of the plurality of electrical conductor units is bent.

According to this configuration, a return force tending to return in an inward direction is generated in the projecting portion of the electrical conductor disposed at the outermost position in the radial direction of the electrical conductor units other than the electrical conductor units located at the outermost position in the radial direction of the plurality of electrical conductor units, and thus the projecting portion does not contact the electrical conductor unit located outside in the radial direction. This can insulate the adjacent units from each other.

An electrical conductor bending apparatus of the present invention is an electrical conductor bending apparatus, in which a leg portion of each of a pair of electrical conductors formed in a U-shape and arranged in a radial direction of an annular shaped stator core is inserted into each of a plurality of slots provided on a circumference of the stator core, and a projecting portion of the leg portion projecting from the slot is bent in a circumferential direction of the stator core, the electrical conductor bending apparatus comprising: a holding member configured to hold the projecting portion of the pair of electrical conductors, a first moving mechanism configured to move the holding member in the circumferential direction of the stator core; a pressure member configured to press one of the projecting portions disposed outside in the radial direction of the pair of electrical conductors and thereby applying a stress in an outward direction of the radial direction, a second moving mechanism configured to move the pressure member in the radial direction; and a control device configured to control driving of the first moving mechanism and the second moving mechanism, wherein the control device performs a pressure control such that the second moving mechanism is driven to move the pressure member outward in the radial direction to press against the one of the projecting portions, and thereby a stress is applied in an outward direction of the radial direction, and at the same time, performs a bending control such that the first moving mechanism is driven to move the holding member holding the one of the projecting portions in the circumferential direction, and thereby the one of the projecting portions is bent in the circumferential direction.

According to this configuration, a return force tending to return in an inward direction is generated by an elastic deformation force in the projecting portion of the one leg portion after bending process. Therefore, the return force facilitates clamping for welding since the projecting portion of the one leg portion (outside) is close to the projecting portion of the other leg portion (inside) in comparison with a configuration without a return force.

Further, in the pressure member, an edge portion contacting the one of the projecting portions is preferably chamfered in an arc shape.

This configuration can prevent the projecting portion from being damaged by the pressing member.

DETAILED DESCRIPTION OF THE PREFERRED EMBODIMENTS

Hereinafter, an embodiment of the present invention will be described with reference to the accompanying drawings.

The description will start with an example of a structure of a rotary electric machine.

Figure 1:
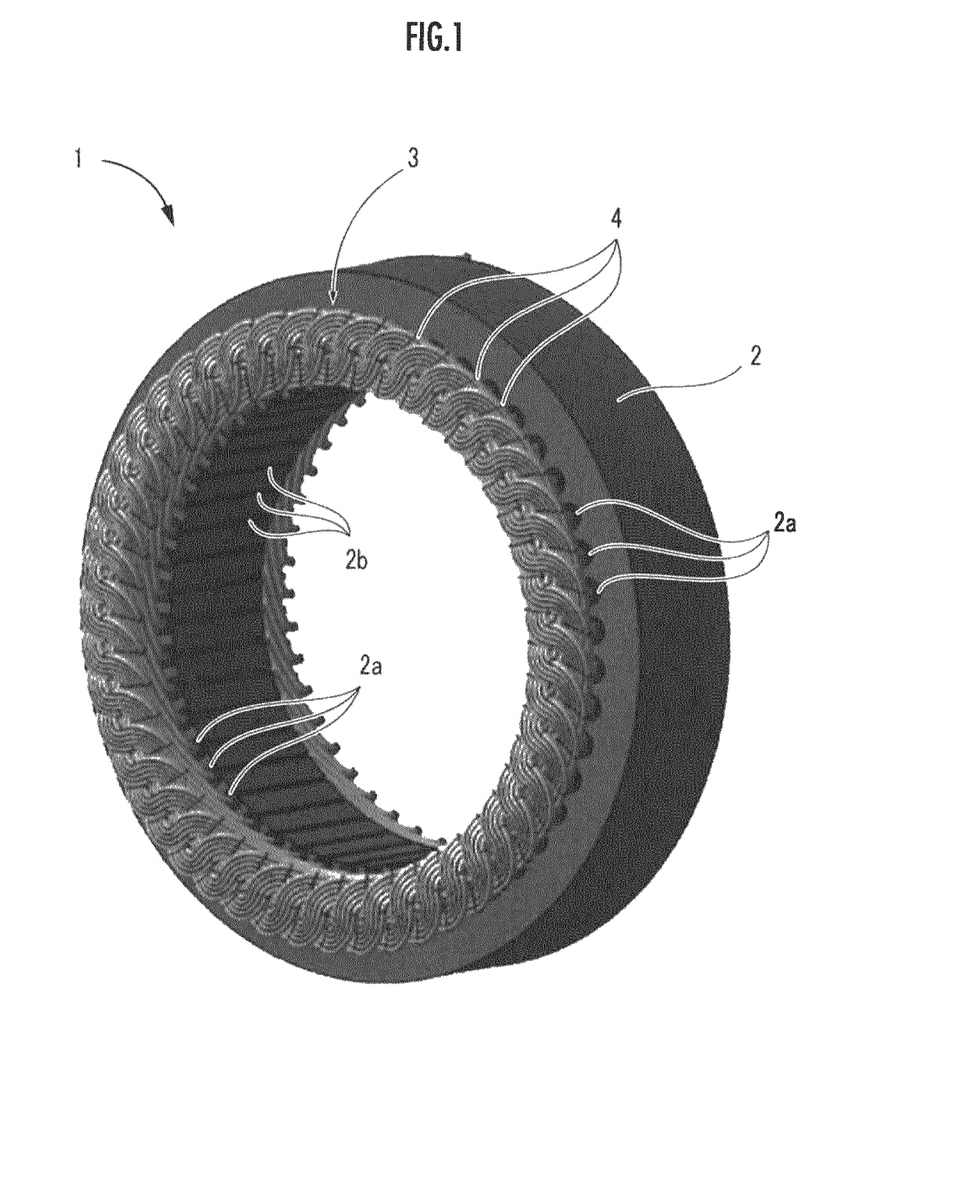
FIG. 1 is a perspective view illustrating a rotary electric machine stator bent by a bending apparatus of the present invention.
Figure 2:
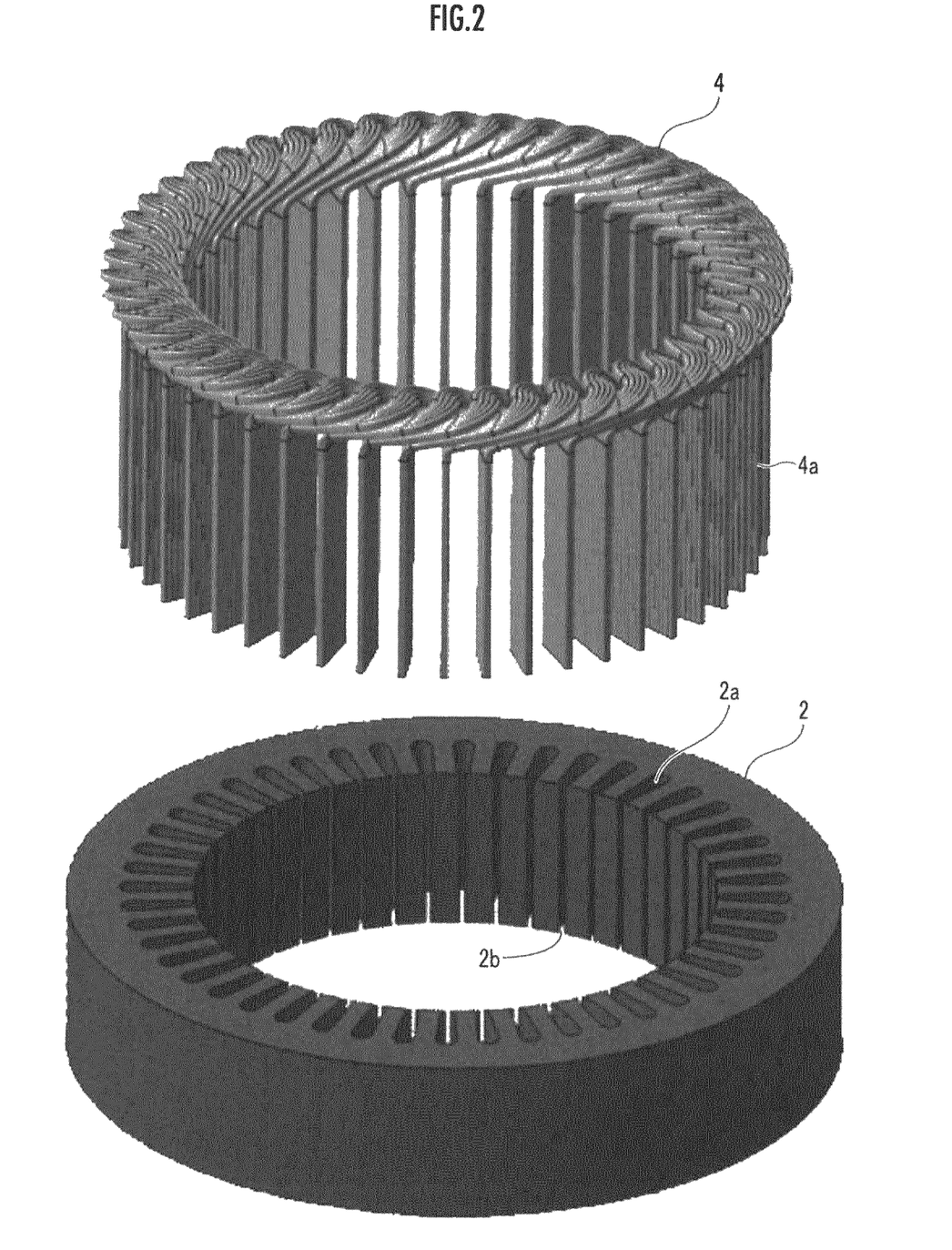
FIG. 2 is a perspective view illustrating a stator core and coil segments.

As illustrated in FIGS. 1 and 2, the rotary electric machine such as an electric motor and a generator comprises a stator 1 formed in a cylindrical shape and a rotor (unillustrated) rotatably disposed inside the stator 1.

The stator 1 comprises a stator core 2 and a coil 3. The stator core 2 has a cylindrical shape, and a plurality of slots 2a passing therethrough in a rotation axis direction are provided spaced apart from each other in a circumferential direction. Each slot 2a is formed such that a radial sectional shape of the stator core 2 radially extends from a center side of the stator core 2 in a radial direction, and communicates with an inner peripheral surface of the stator core 2 through a slit 2b formed in the stator core 2. Note that the slit 2b may be omitted.

Figure 3:
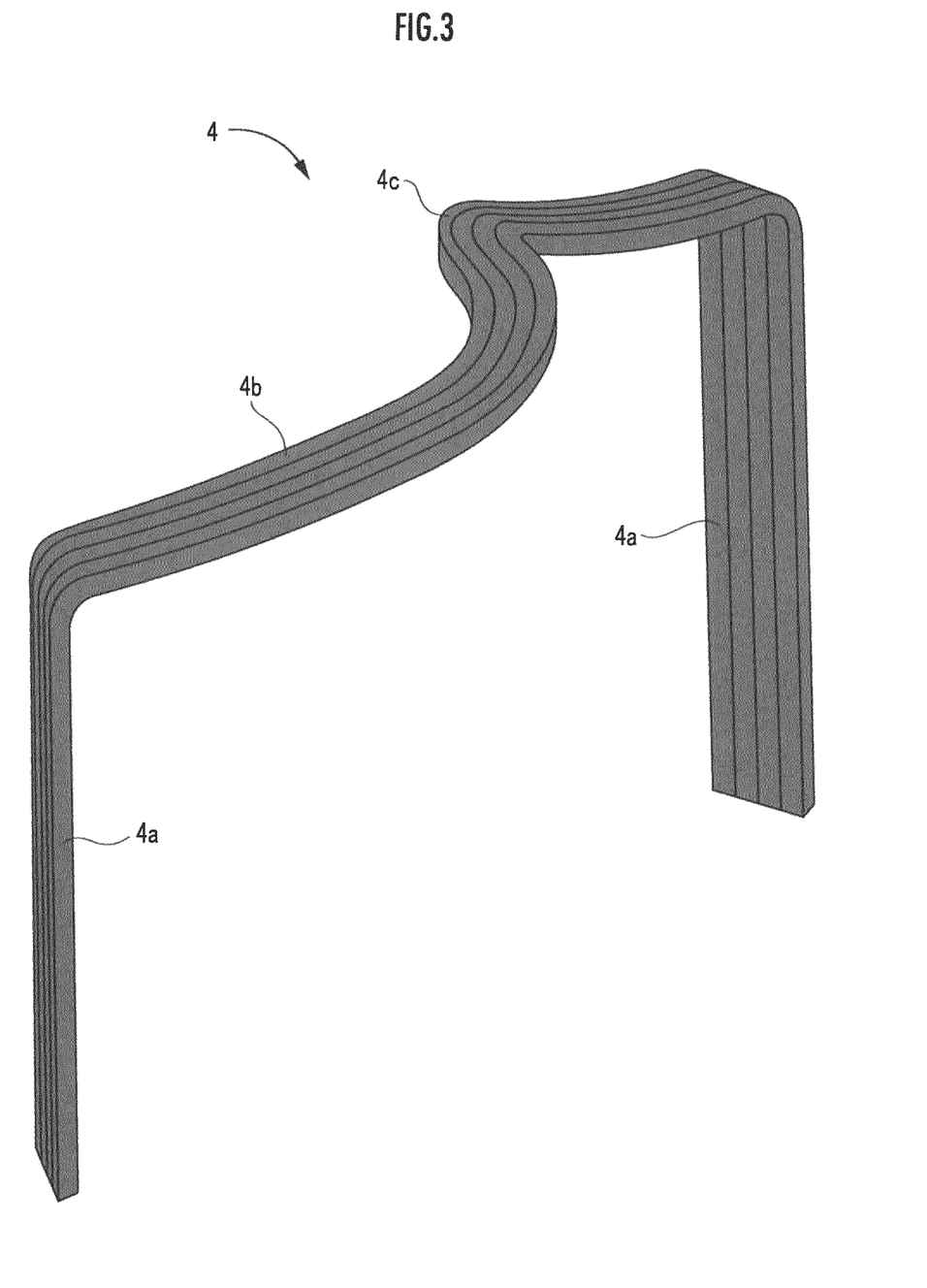
FIG. 3 is a perspective view illustrating a coil segment.

The coil 3 is formed such that a coil segment 4 illustrated in FIG. 3 is inserted into the slot 2a from one side and a projecting portion 4d projecting from the other side of the slot 2a is bent in the circumferential direction and welded.

The coil segment 4 is formed such that a plurality of (four in the present embodiment) conductors (rectangular wire conductors) having a rectangular cross section are arranged in a row so as to face the wider surfaces to each other to form a single bundle in a U-shape. The coil segment 4 includes a pair of leg portions 4a and 4a and a head portion 4b connecting one end (upper end in the Figure) of the two leg portions 4a and 4a.

Note that the coil segment 4 may be any bundle formed by aligning a plurality of rectangular wires in the width direction. For example, the coil segment 4 may be formed such that a plurality of rectangular wires are aligned in a row such that the narrow sides face to each other.

The center of the head portion 4b includes an S-shaped portion 4c curved in an S shape in an alignment direction of the rectangular wire. The head portion 4b is inclined downward from the center (center of the S-shaped portion 4c) toward the two leg portions 4a and 4a. The leg portion 4a of the coil segment 4 is inserted into a corresponding slot 2a from one side thereof. The leg portion 4a of the coil segment 4 is projected from the other side of the slot 2a.

Figure 4A:
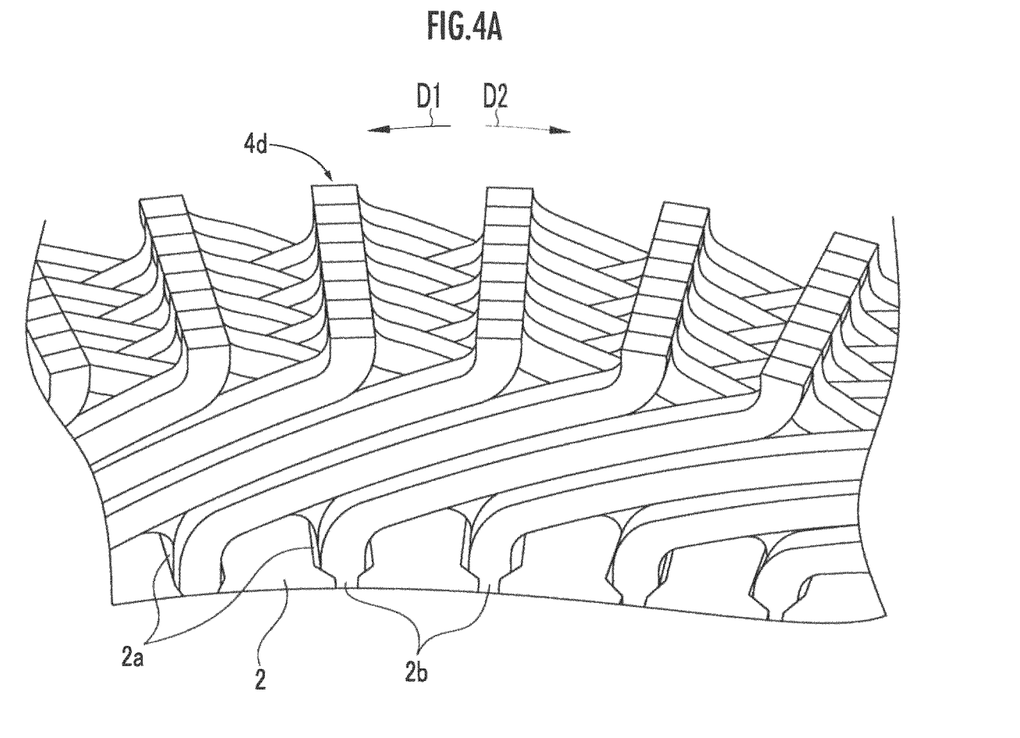
FIG. 4A is a perspective view illustrating a projecting portion of the coil segment.

As illustrated in FIG. 4A, the projecting portion 4d of the leg portion 4a projecting from the other side of the slot 2a is bent in a counterclockwise direction D1 and a clockwise direction D2, which are the circumferential direction of the stator core 2, by a bending apparatus 10 to be detailed later, and the distal end portions of the corresponding projecting portions 4d are welded by a welding device (unillustrated). In this manner, the stator 1 is completed such that eight layers of (eight) coil segments 4 are stacked in the radial direction. Here, the coil segments 4 are aligned in the order of the first layer, the second layer, . . . , and the eighth layer from inside to outside in the radial direction.

In the present embodiment, the first-layer to eighth-layer coil segments 4 include a pair of the first layer and the second layer, a pair of the third layer and the fourth layer, a pair of the fifth layer and the sixth layer, and a pair of the seventh layer and the eighth layer. Further, the first-layer to fourth-layer coil segments are grouped into a unit (first unit), and the fifth-layer to eighth-layer coil segments are grouped in a unit (second unit).

The projecting portion 4d of each of the first-layer to fourth-layer coil segments 4 as the first unit and the projecting portion 4d of each of the fifth-layer to eighth-layer coil segments 4 as the second unit are inserted into the slot 2a of the stator core 2 so as to be spaced apart from each other in the radial direction (an outward direction D3 and an inward direction D4) at a boundary therebetween (a boundary between the projecting portion 4d of the fourth-layer coil segment 4 and the projecting portion 4d of the fifth-layer coil segment 4).

Figure 4B:
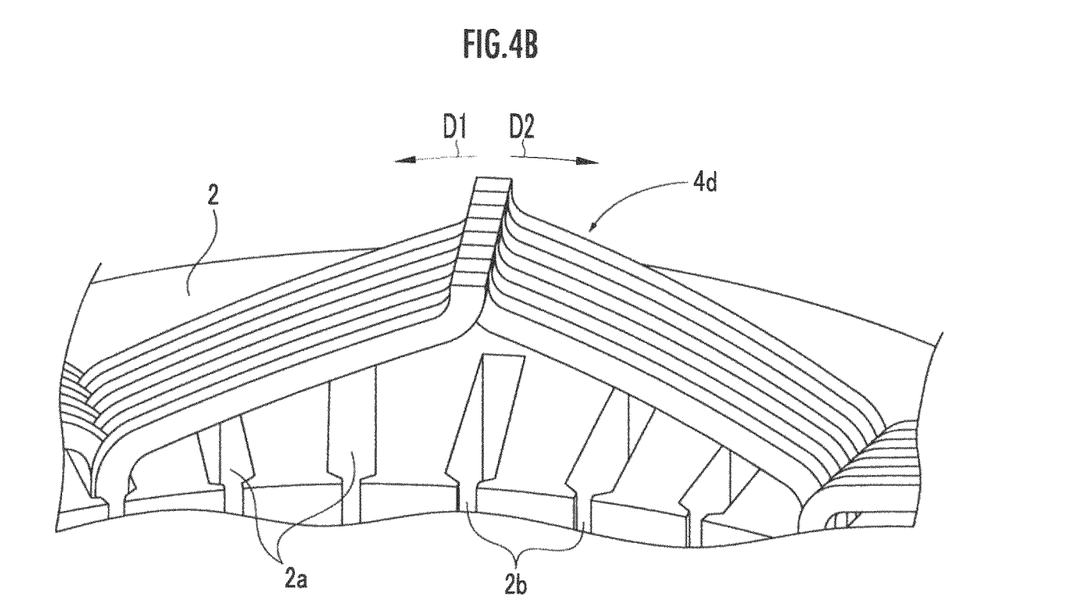
FIG. 4B is a perspective view illustrating the projecting portion of the coil segment.

Note that the coil 3 of the present embodiment is a three-phase coil including a U phase, a V phase, and a W phase. The leg portion 4a of the coil segment 4 inserted into each slot 2a has a U phase, a U phase, a V phase, a V phase, a W phase, and a W phase arranged in that order in the circumferential direction. FIG. 4B illustrates only one-phase coil (for example, a U-phase coil) of the three-phase coil.

The description will now focus on the bending apparatus 10 which bends the projecting portion 4d of the leg portion 4a in the counterclockwise direction D1 and the clockwise direction D2, which are the circumferential direction, as illustrated in FIGS. 5 to 8.

Figure 9:
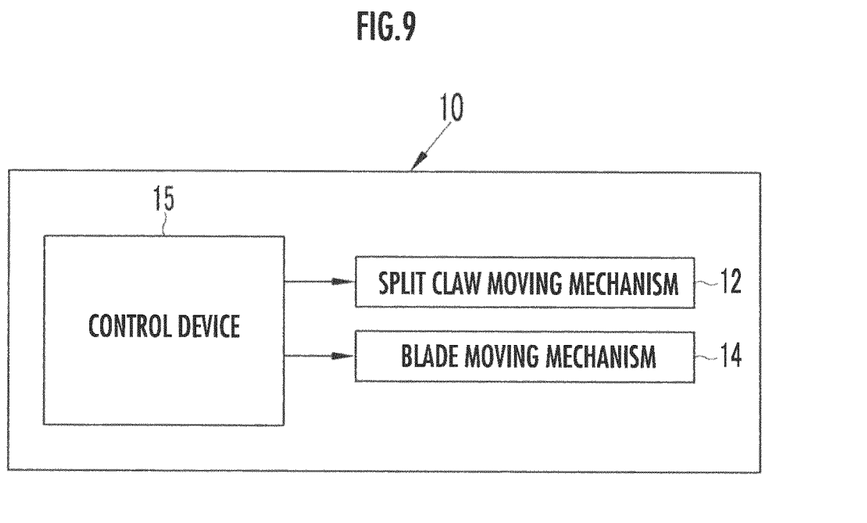
FIG. 9 is a block diagram illustrating an electrical configuration of the bending apparatus.

The bending apparatus 10 comprises a split claw 11 (holding member) holding the distal end portion of the projecting portion 4d, and a split claw moving mechanism 12 (first moving mechanism) (see FIG. 9) which comprises, for example, a motor and gears and moves the split claw 11 in the counterclockwise direction D1 and the clockwise direction D2, and in the outward direction D3 and the inward direction D4 which are the radial direction, and in the axial direction. Note that the holding member holding the distal end portion of the projecting portion 4d is not limited to the split claw 11, but may be appropriately changed.

Further, the bending apparatus 10 comprises first to third extended blades 13a to 13c (pressure member) and a blade moving mechanism 14 (second moving mechanism) (see FIG. 9) which comprises, for example, a motor and gears, and moves the first to third extended blades 13a to 13c in the outward direction D3 and the inward direction D4 which are the radial direction.

The bending apparatus 10 comprises a control device 15 (see FIG. 9) which comprises, for example, a CPU or the like, and integrally controls the bending apparatus 10. The control device 15 controls driving of the split claw moving mechanism 12 and the blade moving mechanism 14. Note that the structure of the split claw moving mechanism 12 and the blade moving mechanism 14 may be appropriately changed. For example, the structure may include a mechanism having a movable lever and a cylinder or may include a robot having a movable arm.

As illustrated in FIGS. 5A to 5D and 6A to 6D, the split claw 11 is opened in the outward direction D3 and the inward direction D4 and holds the distal end portion of the projecting portion 4d. In a state of holding the distal end portion of the projecting portion 4d, the split claw 11 is moved in the counterclockwise direction D1 by the split claw moving mechanism 12 and bends the projecting portion 4d in the counterclockwise direction D1 while maintaining the distal end portion of the held projecting portion 4d in a state of being parallel to an upward direction.

When the projecting portions 4d of even-number-th layers (second layer, fourth layer, sixth layer, and eighth layer) of coil segments 4 are bent in the counterclockwise direction D1, the first extended blade 13a contacts the root portion of the bent projecting portion 4d, the second extended blade 13b contacts the central portion of the bent projecting portion 4d, and the third extended blade 13c contacts the distal end portion of the bent projecting portion 4d. The first to third extended blades 13a to 13c are such that the edge portions contacting the projecting portions 4d are chamfered in an arc shape (for example, a circular arc shape). Note that the positions of the first to third extended blades 13a to 13c may be appropriately changed and the edge portions may not be chamfered.

Note also that the pressure member pressing the projecting portion 4d and thereby applying a stress is not limited to the first to third extended blades 13a to 13c, but may be appropriately changed. For example, the pressure member may be a mechanism having a movable lever and a cylinder or may be a robot having a movable arm.

As illustrated in FIGS. 7A, 7B, 8A, and 8B, in a state of holding the distal end portion of the projecting portion 4d of odd number-th layers (first layer, third layer, fifth layer, and seventh layer) of coil segments 4, the split claw 11 is moved in the clockwise direction D2 by the split claw moving mechanism 12. Thus, while maintaining the distal end portion of the held projecting portion 4d in a state of being parallel to an upward direction, the split claw 11 bends the projecting portion 4d in the clockwise direction D2. Note that the configuration of a pair of coil segments 4 is not limited to the present embodiment as long as the pair of coil segments 4 may be bent in opposite directions.

When the projecting portion 4d is bent in the clockwise direction D2, the first extended blade 13a contacts the distal end portion of the bent projecting portion 4d, the second extended blade 13b contacts the central portion of the bent projecting portion 4d, and the third extended blade 13c contacts the root portion of the bent projecting portion 4d.

[Bending Process]

Figure 5A:
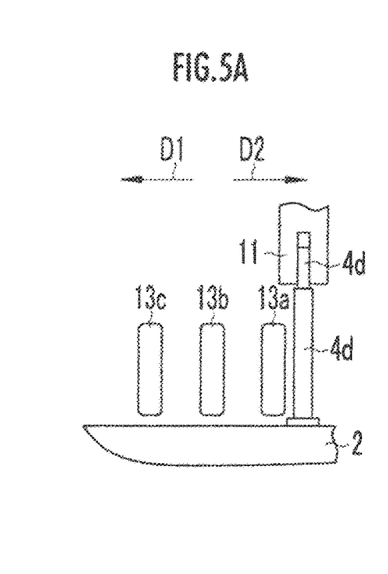
FIG. 5A is a side view illustrating a state in which a projecting portion of an eighth-layer coil segment is held by a split claw of the bending apparatus.
Figure 6A:
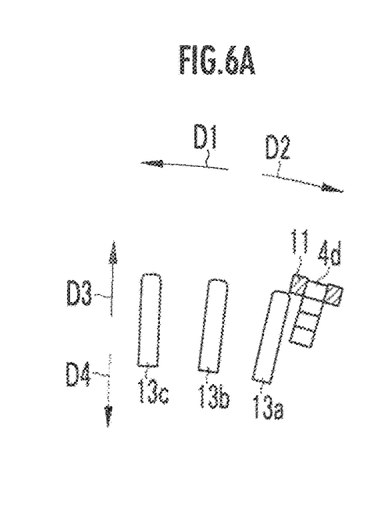
FIG. 6A is a bottom sectional view illustrating a state in which the projecting portion of the eighth-layer coil segment is held by the split claw of the bending apparatus.

When the projecting portions 4d of the coil segments 4 are bent using the bending apparatus 10, as illustrated in FIGS. 5A and 6A, first, the control device 15 drives the split claw moving mechanism 12 to move the split claw 11, thereby to cause the split claw 11 to hold the projecting portion 4d of the eighth-layer coil segment 4 located at the outermost position.

Figure 5B:
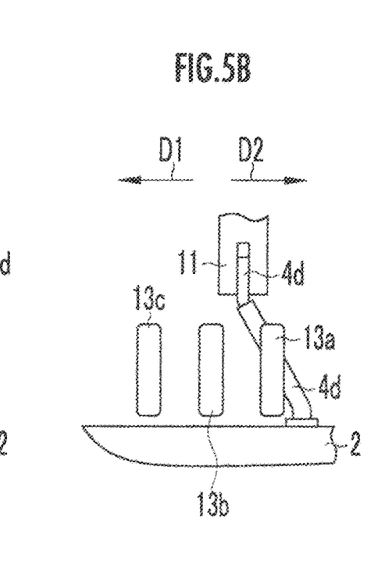
FIG. 5B is a side view illustrating a state in which the projecting portion of the eighth-layer coil segment is bent to a portion of a first extended blade by the bending apparatus.
Figure 6B:
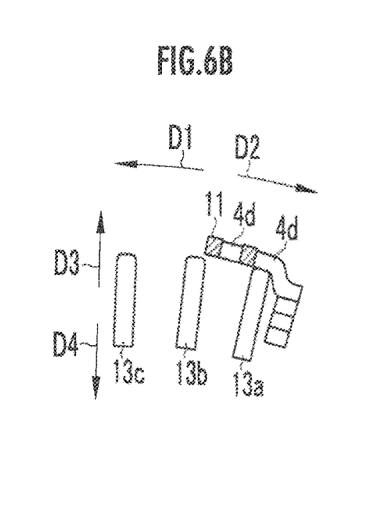
FIG. 6B is a bottom sectional view illustrating a state in which the projecting portion of the eighth-layer coil segment is bent to a portion of the first extended blade by the bending apparatus.

Then, the control device 15 drives the split claw moving mechanism 12 to cause the split claw 11 holding the projecting portion 4d of the eighth-layer coil segment 4 to move in the counterclockwise direction D1 up to the position illustrated in FIGS. 5B and 6B (bending control).

When the split claw moving mechanism 12 is driven to move the split claw 11 in the counterclockwise direction D1 up to the position illustrated in FIGS. 5B and 6B, the control device 15 drives the blade moving mechanism 14 (bending step). At this time, the control device 15 drives the blade moving mechanism 14 to move the first to third extended blades 13a to 13c in the outward direction D3 so that the projecting portion 4d of the eighth-layer coil segment 4 is bent in the outward direction D3 (pressure control). According to this movement, the control device 15 drives the split claw moving mechanism 12 to move the split claw 11 holding the projecting portion 4d in the outward direction D3.

Figure 5C:
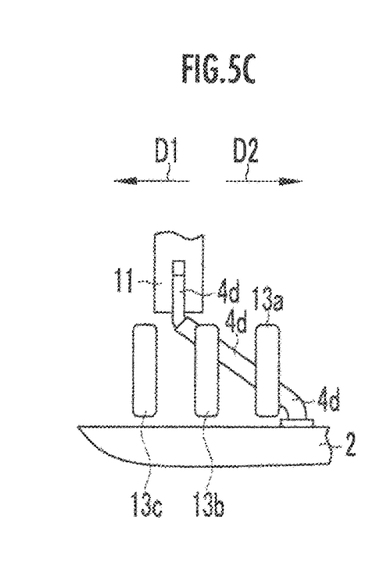
FIG. 5C is a side view illustrating a state in which the projecting portion of the eighth-layer coil segment is bent to a portion of a second extended blade by the bending apparatus.
Figure 6C:
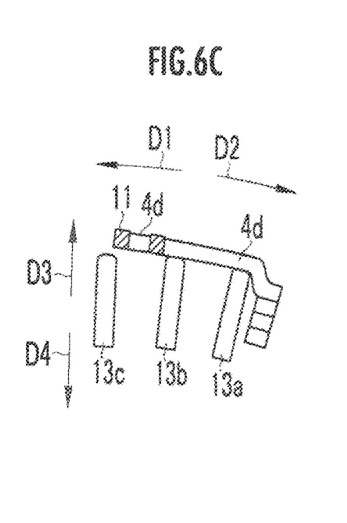
FIG. 6C is a bottom sectional view illustrating a state in which the projecting portion of the eighth-layer coil segment is bent to a portion of the second extended blade by the bending apparatus.

The control device 15 moves the split claw 11 in the counterclockwise direction D1 from the position illustrated in FIGS. 5B and 6B up to the position illustrated in FIGS. 5C and 6C (bending control). At this time, the control device 15 maintains the position in which the first to third extended blades 13a to 13c are moved in the outward direction D3.

Figure 5D:
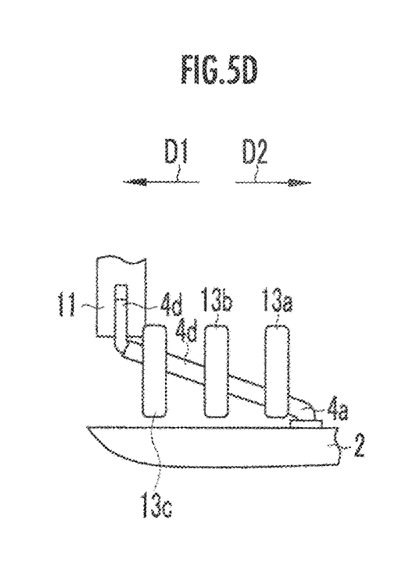
FIG. 5D is a side view illustrating a state in which the projecting portion of the eighth-layer coil segment is bent to a portion of a third extended blade by the bending apparatus.
Figure 6D:
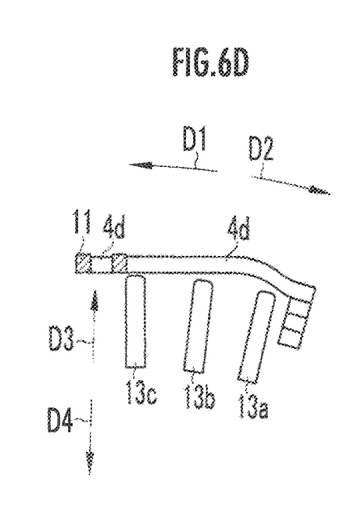
FIG. 6D is a bottom sectional view illustrating a state in which the projecting portion of the eighth-layer coil segment is bent to a portion of the third extended blade by the bending apparatus.

Then, the control device 15 moves the split claw 11 in the counterclockwise direction D1 from the position illustrated in FIGS. 5C and 6C up to the position illustrated in FIGS. 5D and 6D (bending control). At this time, the control device 15 drives the blade moving mechanism 14 to move the first to third extended blades 13a to 13c in the inward direction D4. According to this movement, the control device 15 drives the split claw moving mechanism 12 to move the split claw 11 holding the projecting portion 4d in the inward direction D4. Through the above steps, the projecting portion 4d of the eighth-layer coil segment 4 is bent in the counterclockwise direction D1 while being bent in the outward direction D3.

Figure 7A:
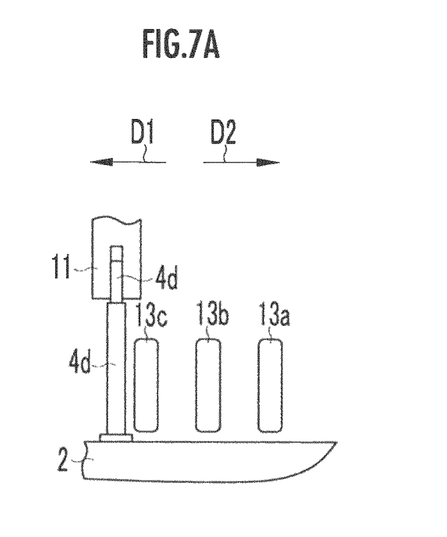
FIG. 7A is a side view illustrating a state in which a projecting portion of a seventh-layer coil segment is held by the split claw of the bending apparatus.
Figure 7B:
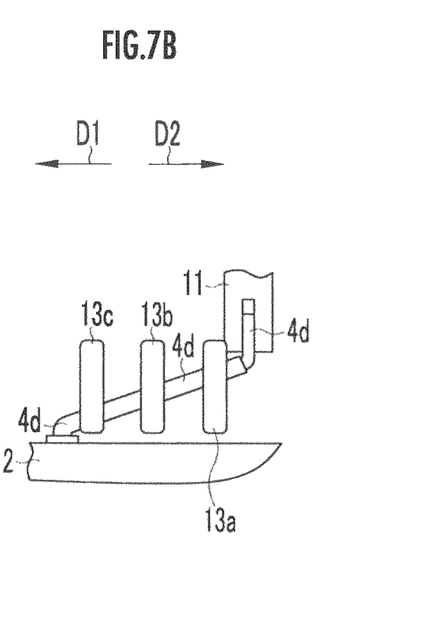
FIG. 7B is a side view illustrating a state in which the projecting portion of the seventh-layer coil segment is bent to a portion of the third extended blade by the bending apparatus.

When the projecting portion 4d of the seventh-layer coil segment 4 is bent, as illustrated in FIGS. 7A and 7B, the control device 15 drives the split claw moving mechanism 12 to move the split claw 11, thereby to cause the split claw 11 to hold the projecting portion 4d of the seventh-layer coil segment 4.

Figure 8A:
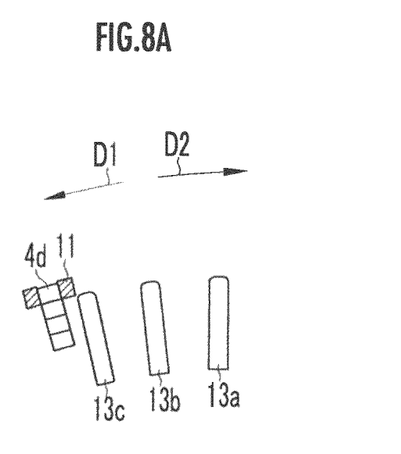
FIG. 8A is a bottom sectional view illustrating a state in which the projecting portion of the seventh-layer coil segment is held by the split claw of the bending apparatus.
Figure 8B:
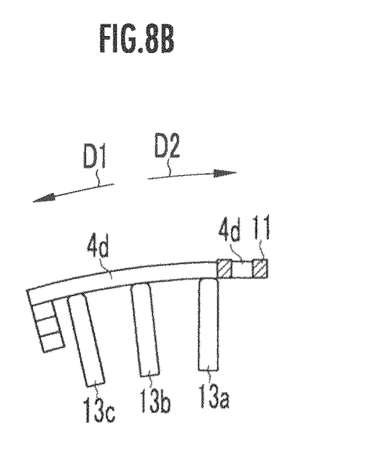
FIG. 8B is a bottom sectional view illustrating a state in which the projecting portion of the seventh-layer coil segment is bent to a portion of the third extended blade by the bending apparatus.
Figure 10:
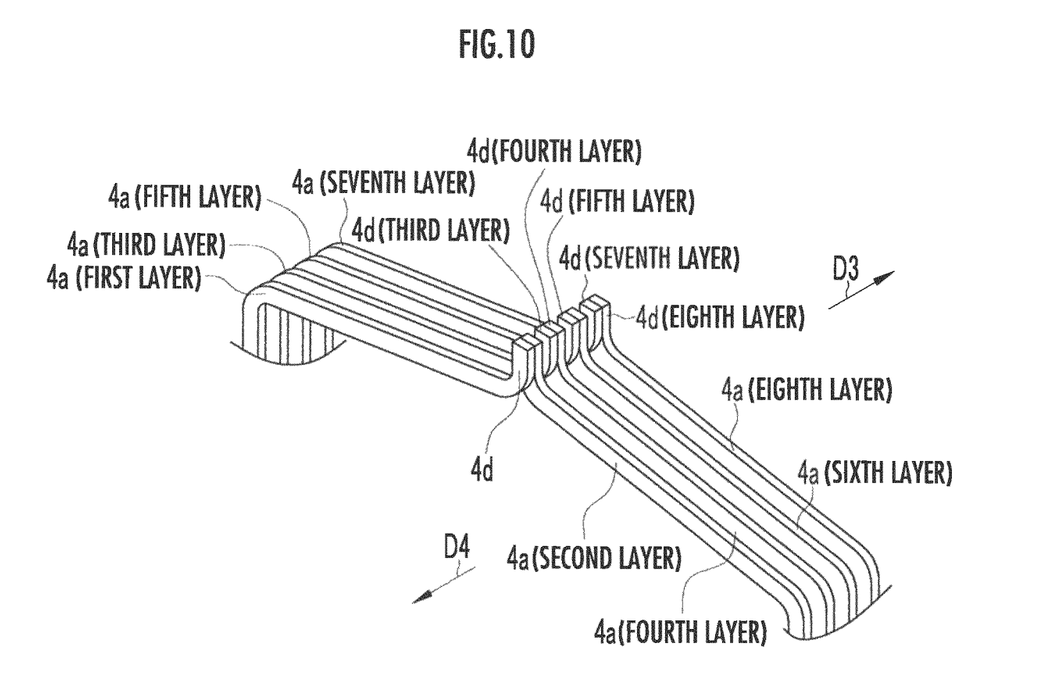
FIG. 10 is a perspective view illustrating the projecting portions of the first-to-eighth-layer coil segments in the bent state.

Then, the control device 15 drives the split claw moving mechanism 12 to cause the split claw 11 holding the projecting portion 4d of the seventh-layer coil segment 4 to move in the clockwise direction D2 up to the position illustrated in FIGS. 7B and 8B. At this time, the control device 15 brings the first to third extended blades 13a to 13c at the position in which the projecting portion 4d of the seventh-layer coil segment 4 is supported without being bent in the outward direction D3. Through the above steps, the projecting portion 4d of the seventh-layer coil segment 4 is bent in the clockwise direction D2. As a result, as illustrated in FIG. 10, the distal end portion of the projecting portion 4d of the eighth-layer coil segment 4 faces the distal end portion of the projecting portion 4d of the seventh-layer coil segment 4.

As described above, the projecting portion 4d of the eighth-layer coil segment 4 is bent in the counterclockwise direction D1 while being bent in the outward direction D3, and thus, a return force (spring back) tending to return in the inward direction D4 is generated by an elastic deformation force. Therefore, the return force facilitates clamping for welding since the projecting portion 4d of the eighth-layer coil segment 4 is close to the projecting portion 4d of the seventh-layer coil segment 4 in comparison with the method without a return force.

When the split claw 11 holding the projecting portion 4d of the seventh-layer coil segment 4 is moved in the clockwise direction D2, the movement trajectory also includes the movement in the inward direction D4. Therefore, when the projecting portion 4d of the seventh-layer coil segment 4 is bent in the clockwise direction D2, the projecting portion 4d of the seventh-layer coil segment 4 is also bent in the inward direction D4. As a result, a return force tending to return in the outward direction D3 is generated by an elastic deformation force. This causes the projecting portion 4d of the seventh-layer coil segment 4 to be close to the projecting portion 4d of the eighth-layer coil segment 4, which further facilitates clamping for welding.

Further, the first to third extended blades 13a to 13c are such that the edge portion contacting the projecting portion 4d is chamfered in an arc shape, which can prevent the projecting portion 4d from being damaged by the first to third extended blades 13a to 13c.

The projecting portions of the sixth-layer, fourth-layer, and second-layer coil segments 4 are bent in the same manner as the projecting portion 4d of the eighth-layer coil segment 4, and the projecting portions of the fifth-layer, third-layer, and first-layer coil segments 4 are bent in the same manner as the projecting portion 4d of the seventh-layer coil segment 4. Thus, the projecting portion 4d of the sixth-layer coil segment 4 is close to the projecting portion 4d of the fifth-layer coil segment 4, the projecting portion 4d of the fourth-layer coil segment 4 is close to the projecting portion 4d of the third-layer coil segment 4, and the projecting portion 4d of the second-layer coil segment 4 is close to the projecting portion 4d of the first-layer coil segment 4.

Note that at least one of the projecting portions 4d of the even-number-th layer coil segments 4 may be bent in the outward direction D3 while being bent in the counterclockwise direction D1, and the projecting portions 4d of the odd number-th layer coil segments 4 may not be bent in the inward direction D4.

In the stator 1, the first unit includes the first-layer to fourth-layer coil segments 4 and the second unit includes the fifth-layer to eighth-layer coil segments 4. In the present embodiment, in order to insulate between the first unit and the second unit, the projecting portion 4d of the fourth-layer coil segment 4 needs to be insulated from the projecting portion 4d of the fifth-layer coil segment 4.

In the present embodiment, a return force tending to return in the inward direction D4 is generated by an elastic deformation force in the projecting portion 4d of the fourth-layer coil segment 4, which can reliably form a clearance between the projecting portion 4d of the fourth-layer coil segment 4 and the projecting portion 4d of the fifth-layer coil segment 4 and can reliably insulate therebetween. In the present invention, preferably at least the projecting portion 4d of the fourth-layer coil segment 4 is bent in the counterclockwise direction D1 while being bent in the outward direction D3.

When there are three or more units having a plurality of coil segments 4, the projecting portion 4d of the coil segment 4 disposed at the outermost circumference of each unit other than the unit located at the outermost circumference is preferably bent in the counterclockwise direction D1 while being bent in the outward direction D3.

Note that in the above embodiment, the projecting portions 4d of the even-number-th layer coil segments 4 are bent in the outward direction D3 while being bent in the counterclockwise direction D1, but a return force tending to return in the inward direction D4 may be generated in the projecting portions 4d or a stress may be applied in the outward direction D3 without bending the projecting portions 4d in the outward direction D3.

Alternatively, without providing the first to third extended blades 13a to 13c, a holding member which is not opened in the outward direction D3 or the inward direction D4 may be used to hold the projecting portions 4d, and by moving the holding member in the outward direction D3, the projecting portions 4d held by the holding member may be bent in the outward direction D3.

What is claimed is:

1. An electrical conductor bending apparatus, in which a leg portion of each of a pair of electrical conductors formed in a U-shape and arranged in a radial direction of an annular shaped stator core is inserted into each of a plurality of slots provided on a circumference of the stator core, and a projecting portion of the leg portion projecting from the slot is bent in a circumferential direction of the stator core, the electrical conductor bending apparatus comprising:
a holding member configured to hold the projecting portion of the pair of electrical conductors;
a first moving mechanism configured to move the holding member in the circumferential direction of the stator core;

a pressure member configured to press one of the projecting portions disposed outside in the radial direction of the pair of electrical conductors and thereby applying a stress in an outward direction of the radial direction;

a second moving mechanism configured to move the pressure member in the radial direction; and a control device configured to control driving of the first moving mechanism and the second moving mechanism, wherein the control device performs a pressure control such that the second moving mechanism is driven to move the pressure member outward in the radial direction to press against the one of the projecting portions, and thereby a stress is applied in an outward direction of the radial direction, and at the same time, performs a bending control such that the first moving mechanism is driven to move the holding member holding the one of the projecting portions in the circumferential direction, and thereby the one of the projecting portions is bent in the circumferential direction.

2. The electrical conductor bending apparatus according to claim 1, wherein in the pressure member, an edge portion contacting the one of the projecting portions is chamfered in an arc shape.

* * * * *